United States Patent Office 3,302,090
Patented Jan. 31, 1967

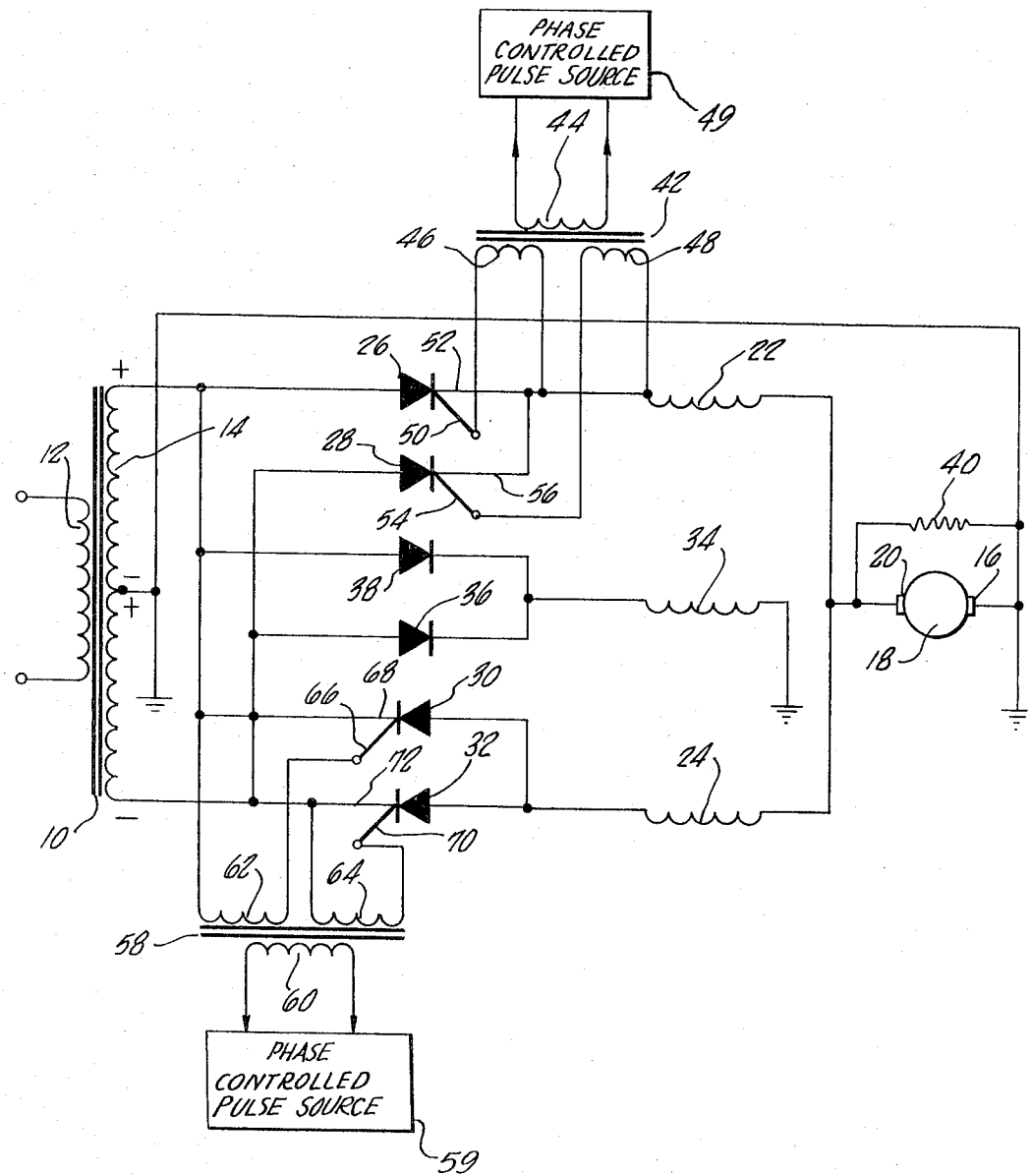

3,302,090
D.C. MOTOR DRIVE CIRCUIT
Harry F. Rayfield, Arcadia, Calif., assignor to Burroughs Corporation, Detroit, Mich., a corporation of Michigan
Filed Mar. 30, 1964, Ser. No. 355,812
3 Claims. (Cl. 318—257)

This invention relates to D.C. motor drive circuits and, more particularly, is concerned with a reversible servo motor drive using a D.C. motor.

The use of D.C. motors in servo drives is well known. Commonly, the motor is driven from an A.C. source and by means of grid controlled rectifiers such as thyratrons or silicon controlled rectifiers, provides a controlled pulsed D.C. from the A.C. source to vary the torque of the motor. To obtain a reversible motor drive, the use of split field series windings has been used such that current through one field winding or the other will produce rotation of the armature in one direction or the other. A shunt field motor can be made reversible by providing inverse parallel connected controlled rectifiers for passing current in one direction or the other through the armature. Such well known circuits are quite inefficient in operation and therefore not very good for operating substantial loads because they operate on half wave rectified current.

Servo motor control circuits for D.C. motors have also been developed using full wave rectified D.C. current, such as the servo described in copending application Serial No. 213,286, filed July 30, 1962 in the name of the present inventor and assigned to the same assignee as the present invention. Such circuits provide control in only one direction of rotation. Reversal of the motor is accomplished by means of a relay which reverses the connections to the armature to reverse the polarity of the current through the armature in relation to the field. In servo applications where the direction of drive changes frequently, the effectiveness of such circuits is limited by the shortcomings of the relay, namely, the short life of the contacts when switching large inductive loads and the relatively slow response time of the relay.

While servo circuits have been developed which provide full wave rectified drive currents through the motor, such circuits have required that the motor be a split series field type of motor. Without the shunt field, there is no dynamic braking available in the motor itself and some alternative scheme, such as a mechanical or electro-mechanical drag means, must be provided to achieve effective damping of the servo motor.

The present invention is directed to a reversible servo control circuit for a D.C. motor having a shunt field, the control circuit providing full wave rectified drive currents to the motor. The circuit provides a full control of both direction and level of torque produced by the motor. No relay or other mechanical switching device is required for reversing the direction of torque of the motor and the shunt field provides active damping of the motor when the control signal is reduced or turned off.

In brief, the present invention provides a reversible motor control circuit in combination with a D.C. motor having a shunt field winding and first and second series field windings. The shunt field winding is excited from a suitable D.C. source. The servo circuit includes silicon controlled rectifiers arranged to pass controlled amounts of full wave rectified current through the armature in one or other of the series field windings in a manner to control the direction and magnitude of the torque generated by the motor.

For a more complete understanding of the invention, reference should be made to the accompanying drawing wherein the single figure is a schematic circuit diagram of the preferred embodiment of the present invention.

Referring to the drawing in detail, the numeral 10 indicates generally a power transformer having a primary 12 adapted to be connected to a line source of A.C. power. The transformer 10 has a center-tapped secondary winding 14. The center-tap of the secondary winding 14 is connected to one brush 16 associated with an armature 18 of a D.C. motor. A second brush 20 is connected respectively to first and second series field windings 22 and 24 of the D.C. motor. The field windings 22 and 24 are arranged such that current in one direction through the armature and one of the field windings produces torque in one direction, while a current in the opposite direction through the armature and the other of the field windings produces a torque in the opposite direction.

A full wave rectified D.C. current is derived from the secondary 14 of the transformer 10 and applied across the armature 18 and series field winding 22 by means of a pair of silicon-controlled rectifiers 26 and 28. The rectifiers 26 and 28 are polarized to pass current in the same direction through the series field winding 22 and armature 18 during alternate half cycles of the A.C. voltage appearing across the secondary 14.

Similarly, a full wave rectified current is provided through the series field winding 24 and armature 18 by third and fourth silicon controlled rectifiers indicated at 30 and 32 respectively. The rectifiers 30 and 32 are polarized to pass current in the opposite direction through the armature 18 and through the series field winding 24 in relation to the rectifiers 26 and 28. Thus by turning the rectifiers on in pairs, the full wave rectified current of either polarity may be applied to the armature 18 and one or the other of the associated series field windings to provide rotation of the armature in either one direction or the other.

To provide active damping of the armature 18, a shunt field 34 is provided in the D.C. motor. The shunt field 34 may be excited by any suitable D.C. source, such as the full wave rectifier shown in the figure. The full wave rectifier includes a pair of diode rectifiers 36 and 38 connecting one end of the shunt field to opposite ends of the secondary winding 14 of the transformer 10. The other end of the shunt field is connected to the center-tap of the secondary winding 14. Thus a full wave rectified current is applied to the shunt field 34. A damping resistor 40 is connected across the armature 18 and acts as a damping load when the armature 18 tries to rotate in the magnetic field provided by the shunt winding 34.

Any suitable control circuit may be used to control the silicon controlled rectifiers to vary the amount of torque produced by the D.C. motor. For example, the silicon controlled rectifiers 26 and 28 may be controlled through a pulse transformer 42 having a primary winding 44 and a pair of secondary windings 46 and 48. The secondary winding 46 is connected between the control electrode 50 and the cathode 52 of the rectifier 26. The secondary winding 48 is similarly connected between the control electrode 54 and cathode 56 of the rectifier 28. Thus whenever the primary winding 44 is pulsed, as by a phase controlled pulse source 49, one or the other of the rectifiers is caused to fire. By pulsing the primary at intervals corresponding to the half wave period of the voltage derived transformer 10, the rectifiers 26 and 28 are turned on at alternate half cycles providing a full wave rectified current through the series field winding 22. The phase relationship between the pulses applied to the primary winding 44 and the A.C. voltage across the transformer 10 determines the time during each half cycle in which the respective rectifiers are turned on, thus controlling the average current through the D.C. motor to control the torque.

Similarly, the rectifiers 30 and 32 are controlled by the pulse transformer 58 having a primary winding 60, connected to a phase controlled pulse source 59 and a pair of secondary windings 62 and 64. The secondary winding 62 is connected between the control electrode 66 and cathode 68 of the rectifier 30. Similarly, the secondary winding 64 is connected between the control electrode 70 and cathode 72 of the rectifier 32. By selectively pulsing either the transformer 42 or the transformer 58, the direction of rotation of the D.C. motor is controlled. The particular manner in which the pulse transformers 42 and 58 are pulsed forms no part of the present invention, but may, for example, be pulsed in the manner described in the above-mentioned copending application.

From the above description, it will be recognized that a drive circuit is provided for controlling a shunt type D.C. motor. The circuit is characterized by the fact that the motor can be driven in either direction and can be operated on full wave rectified current, i.e., the motor is pulsed each half cycle of an A.C. power source. While providing reversible control of the motor without use of relays, the circuit provides the dynamic damping feature obtained by using a D.C. excited shunt field.

What is claimed is:

1. A reversible motor control circuit comprising a D.C. motor having an armature, a shunt field winding, and first and second series field windings, a power transformer having a center-tapped secondary winding energized from a single phase A.C. source, the armature being connected to the center-tap and to one end of both the first and second series windings, first and second silicon controlled rectifiers having control electrodes for connecting the other end of the first series winding respectively to opposite ends of the secondary winding, third and fourth silicon controlled rectifiers having control electrodes for connecting the other end of the second series winding respectively to opposite ends of the secondary winding, the first and second rectifiers being polarized to pass current in one direction through the armature and the third and fourth rectifiers being polarized to conduct current in the opposite direction through the armature, control means coupled to the control electrodes of the silicon controlled rectifier for selectively turning on either the first and second rectifiers or the third and fourth rectifiers, and means for passing current through the shunt winding in one direction.

2. A reversible motor control circuit comprising a D.C. motor having an armature, a shunt field winding, and first and second series field windings, a power transformer having a center-tapped secondary winding energized from a single phase A.C. source, the armature being connected to the center-tap and to one end of both the first and second series windings, first and second rectifiers having control electrodes for respectively connecting the other end of the first series winding to both ends of the secondary winding, third and fourth rectifiers having control electrodes for respectively connecting the other end of the second series winding to both ends of the secondary winding, the first and second rectifiers being polarized to pass current in one direction through the armature and the third and fourth rectifiers being polarized to conduct current in the opposite direction through the armature, control means coupled to the control electrodes of the rectifier for selectively turning on either the first and second rectifiers or the third and fourth rectifiers, and means for passing a current through the shunt winding in one direction.

3. A reversible motor control circuit comprising a D.C. motor having an armature, a shunt field winding, and first and second series field windings, a power transformer having a center-tapped secondary winding energized from a single phase A.C. source, the armature being connected to the center-tap and to one end of both the first and second series windings, first and second rectifiers for respectively connecting the other end of the first series winding to both ends of the secondary winding, third and fourth rectifiers for respectively connecting the other end of the second series winding to both ends of the secondary winding, the first and second rectifiers being polarized to pass current in one direction through the armature and the third and fourth rectifiers being polarized to conduct current in the opposite direction through the armature, control means for selectively turning on either the first and second rectifiers or the third and fourth rectifiers, and means for passing a current through the shunt winding in one direction.

References Cited by the Examiner

UNITED STATES PATENTS

| | | | |
|---|---|---|---|
| 1,961,822 | 6/1934 | Freese | 318—380 |
| 2,452,966 | 11/1948 | Thomas | 318—297 |
| 2,665,402 | 1/1954 | Clark | 318—252 X |
| 2,975,348 | 3/1961 | Callen et al. | 318—257 |
| 3,105,179 | 9/1963 | Young et al. | 318—246 X |

OTHER REFERENCES

IBM Technical Disclosure Bulletin: March 1964; volume 6, No. 10, p. 85; "Motor Control System."

ORIS L. RADER, *Primary Examiner.*

G. A. FRIEDBERG, *Assistant Examiner.*